April 15, 1930.  C. C. FARMER ET AL  1,754,230
PISTON AND PACKING RING
Filed April 10, 1928
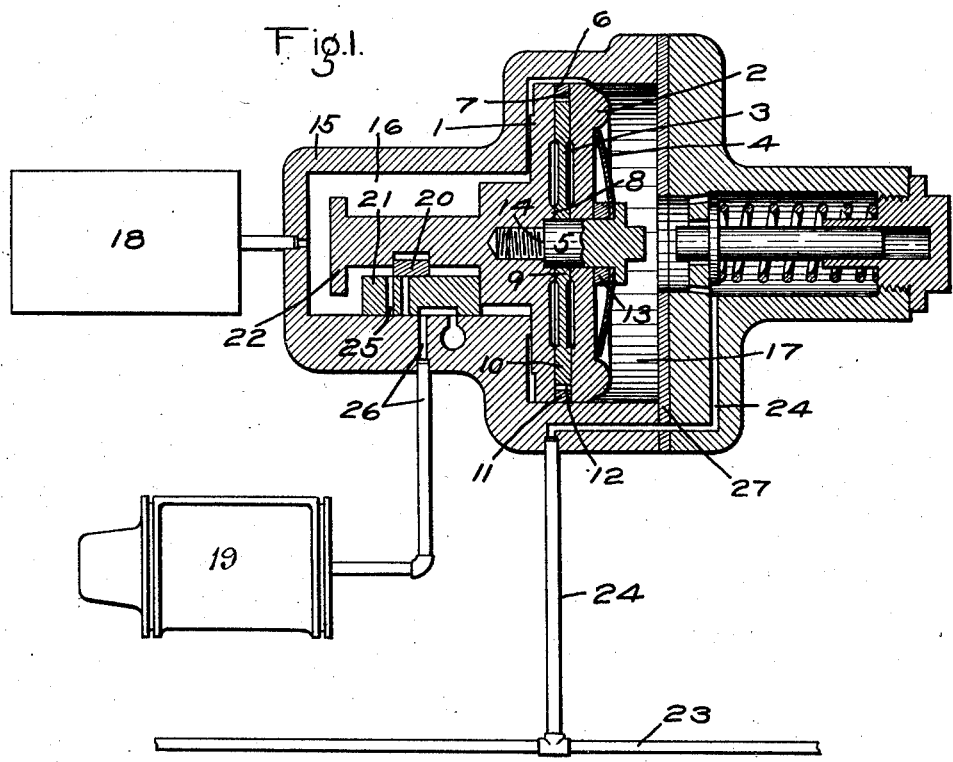
Fig.1.
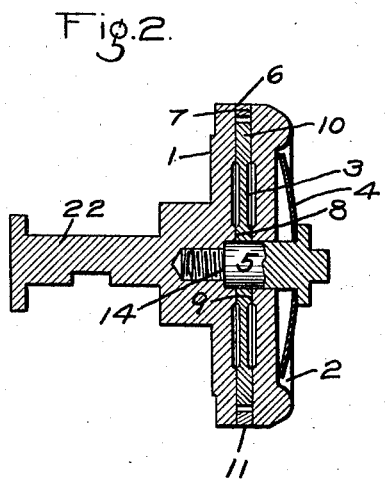
Fig.2.
INVENTOR
CLYDE C. FARMER
AND WILLIAM C. LANDIS
BY
ATTORNEY Patented Apr. 15, 1930

1,754,230

UNITED STATES PATENT OFFICE

CLYDE C. FARMER AND WILLIAM C. LANDIS, OF PITTSBURGH, PENNSYLVANIA, ASSIGNORS TO THE WESTINGHOUSE AIR BRAKE COMPANY, OF WILMERDING, PENNSYLVANIA, A CORPORATION OF PENNSYLVANIA

PISTON AND PACKING RING

Application filed April 10, 1928. Serial No. 268,836.

This invention relates to pistons and more particularly to pistons for use in fluid pressure apparatus.

It is the usual practice to form a piston of a single integral piece of metal and to cut or otherwise form a packing ring groove therein. After the groove has thus been formed, the packing ring is forced over the periphery of the piston until it snaps into place in the groove. It is desirable that the piston ring fit snugly in the groove and yet be free to expand and contract in operation, and to accomplish this, the side walls of the groove, as well as the sides of the ring, must be substantially parallel and free from defects, but in forming a groove in the manner described above it has been found that, due to variations in the structure of the metal from which the piston is formed, and due to unavoidable inaccuracies in machining, it is practically impossible to form these side walls parallel, which results in the improper fitting of the ring in the groove. Further, the forcing of the packing ring over the periphery of the piston, preparatory to its snapping into place in the groove, tends to distort and otherwise damage the ring, so that it would not properly fit in the groove. As the packing ring groove is so narrow and shallow, it does not lend itself to precision grinding or finishing to eliminate any imperfections or inaccuracies which may exist in the side walls of the groove.

The principal object of our invention is to provide an improved piston in which, the above mentioned manufacturing difficulties and other objectionable features, in connection with the ordinary piston, is eliminated and in which precision grinding or finishing of the sides of the packing ring groove is facilitated.

Another object of our invention is to provide a piston comprising a pair of piston discs adapted to cooperate to define a packing ring groove.

Another object of our invention is to provide a piston to which a packing ring may be applied without in any way distorting or tending to distort the ring.

A further object of our invention is to provide a piston having a pair of piston discs and a packing ring mounted therebetween and to provide means for preventing the leakage of fluid under pressure from one side of the piston to the other through the piston.

Other objects and advantages will appear from the following more detailed description of our invention.

In the accompanying drawing; Fig. 1 is a diagrammatic view, partly in section, of a triple valve device embodying a piston constructed in accordance with our invention; and Fig. 2 is a sectional view taken through a modified form of our invention.

As shown in the drawing, our improved piston may comprise piston discs 1 and 2 which are spaced apart by a spacer 3, and are operatively connected together through the medium of a resilient member such as a spring 4 and a stem or headed bolt 5 which passes through openings formed centrally in the spring 4, disc 2 and spacer 3, which bolt at its inner end has screw-threaded connection with the piston disc 1.

Adjacent the periphery of the piston, the opposing faces of the discs 1 and 2 are provided with bearing surfaces 6 and 7 respectively and around the center of the discs these faces are provided with bearing surfaces 8 and 9 respectively. The bearing surfaces 6 and 8 of the disc 1 are in a common plane, as are also the bearing surfaces 7 and 9 of the disc 2, thus rendering it easy to accurately finish these surfaces.

The spacer 3 is of less diameter than the piston discs 1 and 2, and is provided with a peripheral enlargement 10, the sides of which are adapted to be engaged by the surfaces 6 and 7 of the discs 1 and 2 respectively. The central portion of the spacer 3 is made the same thickness as the enlargement 10, and the side of this portion is adapted to be engaged by the surfaces 8 and 9 of the discs 1 and 2 respectively. The sides of the peripheral enlargement 10, and the sides of the central thickened portion, are accurately finished, so that, when the discs 1 and 2 and the spacer 3 are in their operative positions, the surfaces 6 and 7 will be spaced apart the proper distance to permit the free expansion and contraction of the packing ring 11 mounted in the groove. The periphery 12 of the spacer limits the depth of the packing ring groove and prevents the ring from moving out of place during the assembling of the piston or when the piston is being mounted in a cylinder.

To prevent leakage of fluid under pressure from one side of the piston to the other, by way of any space which may exist between the disc 2 and the bolt 5, a gasket 13 may be provided between the spring 4 and the disc 2 which will form an air tight seal between the disc and the bolt.

Preparatory to assembling the piston, the bearing surfaces of the discs 1 and 2 and spacer 3 are machined or ground true.

To assemble the piston, the spring 4, gasket 11, disc 2, and spacer 3 may be first mounted on the bolt 5 and then the packing ring may be placed on the disc 2 so that it surrounds the spacer 3. The end of the bolt is then screwed into the disc 1. As the bolt is thus screwed into the disc 1, the spring will be compressed and will cause the discs 1 and 2 to be moved into close contact with the bearing surfaces of the spacer 3. The spring in turn will force the gasket 11 into close contact with the disc 2. To prevent the springing or otherwise distorting of the disc 2, the bolt 5 is provided with a shoulder 14 which is adapted to engage a corresponding shoulder formed on the disc 1 to limit the compression of the spring 4 and gasket 13 and thereby the pressure on the disc 2. It will here be noted that the edge of the spring 4 engages the disc 2 in the plane of the enlargement of the spacer 3, so that no pressure will be brought to bear on an unsupported part of the disc, thus further safeguarding the disc 2 against distortion. The discs 1 and 2 may be made of brass or any other suitable material, such as stainless steel. As stainless steel is more rigid than brass, piston discs of a given thickness, made from stainless steel will not spring or distort as easily as plates made from brass.

It will be noted from the foregoing description that the several parts of our piston may be easily made accurate, and that when assembled they will define a packing ring groove, the sides of which will be substantially parallel so that there will be an even bearing between the packing ring and the sides of the groove.

In cases where it is not essential that the piston be air tight, the gasket 13 may be omitted, as shown in Fig. 2 of the drawing.

In Fig. 1 of the drawing, our improved piston has been shown forming a part of a tripple valve device for use in fluid pressure brake systems, which valve device may comprise a casing 15. In this embodiment of the invention, the gasket 13 prevents leakage of fluid under pressure from the slide valve chamber 16 at one side of the piston to the chamber 17 at the other side of the piston. The auxiliary reservoir 18 is connected to the slide valve chamber 16. Communication from this valve chamber to the brake cylinder 19 is controlled by a graduating valve 20 and a slide valve 21 which are operative through the medium of a stem 22 extending rearwardly from the piston disc 1. The chamber 17 is connected to the brake pipe 23 by way of passage and pipe 24. When the system is charged and the piston moves to emergency position, due to the sudden venting of fluid under pressure from the brake pipe, fluid under auxiliary reservoir pressure will flow from the valve chamber 16 to the brake cylinder by way of a port 25 in the slide valve 21 and passage and pipe 26. It will here be noted that to hold the brakes applied, fluid under pressure in the valve chamber 16 must not be permitted to leak away, and to prevent such leakage through the piston by way of any space between the packing ring 11 and the discs 1 and 2 and any space between the disc 2 and the bolt 5, the gasket 13 is provided which forms an air tight seal between the disc and bolt 5. Leakage from one side of the piston to the other past the packing ring 11 will be prevented by the piston sealing against a gasket 27.

While two illustrative embodiments of the invention have been described in detail, it is not our intention to limit its scope to these embodiments or otherwise than by the terms of the appended claims.

Having now described our invention, what we claim as new and desire to secure by Letters Patent, is:—

1. A piston comprising a pair of discs adapted to define a packing ring groove, said discs having supported portions and unsupported portions, and resilient means for securing said discs together, said resilient means acting on the supported portions only of said discs.

2. A piston comprising a pair of circular discs adapted to define a packing ring groove, each of said discs having spaced thickened portions, a member interposed between said discs adapted to be engaged by said thickened portions, and means for urging said discs into engagement with said member, the pressure of said means acting on the thickened portions of said discs to prevent the distortion of said discs.

3. In a piston, the combination with a disc, of a stem on said disc, a disc loosely mounted on said stem, a spacer loosely mounted on said stem interposed between said discs and having a thickened portion spacing said discs, a packing ring mounted between said discs, and means interposed between said stem and second mentioned disc adapted to urge both of said discs into engagement with the thickened portion of said spacer, said means engaging the second mentioned disc over the thickened portion of said spacer.

4. In a piston, the combination with a pair of discs adapted to define a packing ring groove, a spacer between said discs adapted to limit the width of said groove, a member extending through one of said discs and spacer and having screw-threaded connection with the other of said discs, and means interposed between one of said discs and member for urging both of said discs into engagement with said spacer.

5. In a piston, the combination with a pair of discs adapted to define a packing ring groove, a spacer between said discs adapted to limit the width of said groove, a member extending through one of said discs and spacer and having screw-threaded connection with the other of said discs, means interposed between one of said discs and member for urging both of said discs into engagement with said spacer, and means on said stem adapted to engage one of said discs for limiting the pressure on the first mentioned means.

6. A piston comprising a pair of discs adapted to define the sides of a packing ring groove, a spacing member having a thickened peripheral portion, and means for urging said discs into engagement with said thickened portion.

7. A piston comprising a pair of discs having peripheral thickened portions adapted to define the sides of a packing ring groove, a spacing member having a thickened peripheral portion adapted to be engaged by the thickened portions of said discs, and means for urging said discs in engagement with said spacing member.

In testimony whereof we have hereunto set our hands this 6th day of April, 1928.

CLYDE C. FARMER.
WILLIAM C. LANDIS.